United States Patent [19]

Leger

[11] 4,124,732
[45] Nov. 7, 1978

[54] THERMAL INSULATION ATTACHING MEANS

[75] Inventor: Lubert J. Leger, Friendswood, Tex.

[73] Assignee: The United States of America as represented by the Administrator of the National Aeronautics and Space Administration, Washington, D.C.

[21] Appl. No.: 786,913

[22] Filed: Apr. 12, 1977

Related U.S. Application Data

[63] Continuation-in-part of Ser. No. 555,750, Mar. 5, 1975, abandoned.

[51] Int. Cl.$^2$ .......................... B64C 1/00; B32B 7/00
[52] U.S. Cl. ..................................... 428/77; 244/121; 244/158; 244/160; 428/189; 428/212; 428/332; 428/280; 428/285; 428/286; 428/447; 428/450; 428/920
[58] Field of Search ................. 428/280, 285, 77, 447, 428/450, 234, 252, 298, 332, 286, 300, 920, 189; 52/750; 244/117 R, 119, 121, 126, 158, 160

[56] References Cited

U.S. PATENT DOCUMENTS 3,082,611  3/1963  Alvis et al. .............................. 106/86
3,920,339  11/1975  Fletcher ................................ 428/447

FOREIGN PATENT DOCUMENTS 2,238,637  2/1974  Fed. Rep. of Germany ........... 428/300

Primary Examiner—George F. Lesmes
Assistant Examiner—P. Thibodeau
Attorney, Agent, or Firm—Russell E. Schlorff; John R. Manning; Marvin F. Matthews

[57] ABSTRACT

An improved isolation system is provided for attaching ceramic tiles of insulating material to the surface of a structure sought to be protected against extreme temperatures of the nature expected to be encountered by the space shuttle orbiter. This system isolates the fragile ceramic tiles from thermally and mechanically induced vehicle structural strains. The insulating tiles are affixed to a felt isolation pad formed of closely arranged and randomly oriented fibers by means of a flexible adhesive and in turn the felt pad is affixed to the metallic vehicle structure by an additional layer of flexible adhesive.

4 Claims, 3 Drawing Figures

U.S. Patent     Nov. 7, 1978     4,124,732
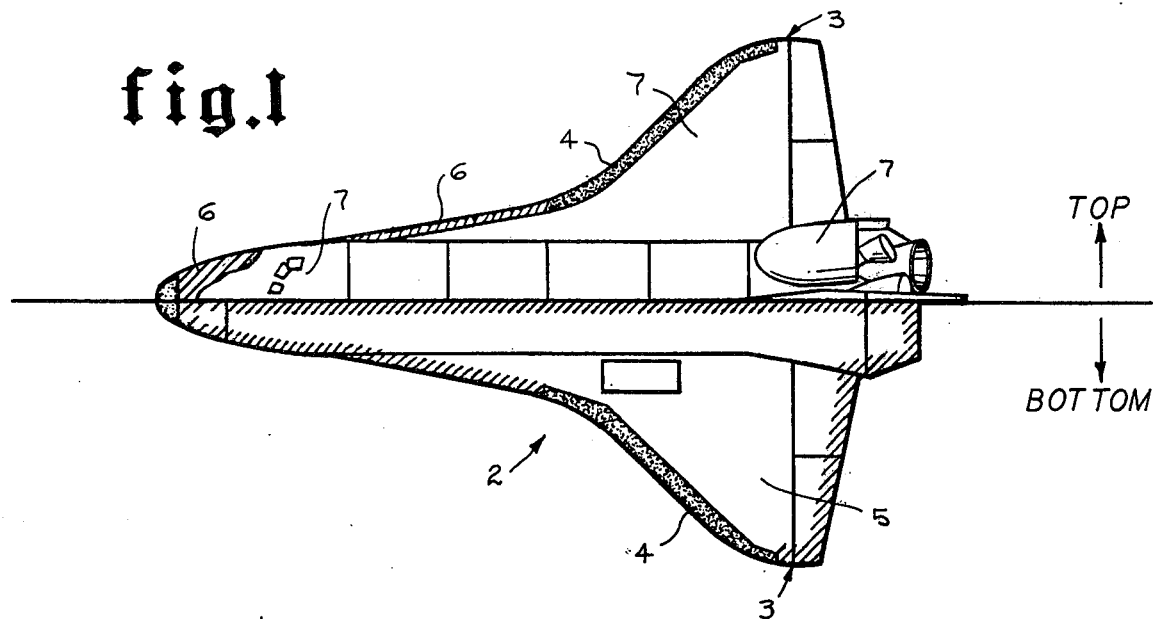
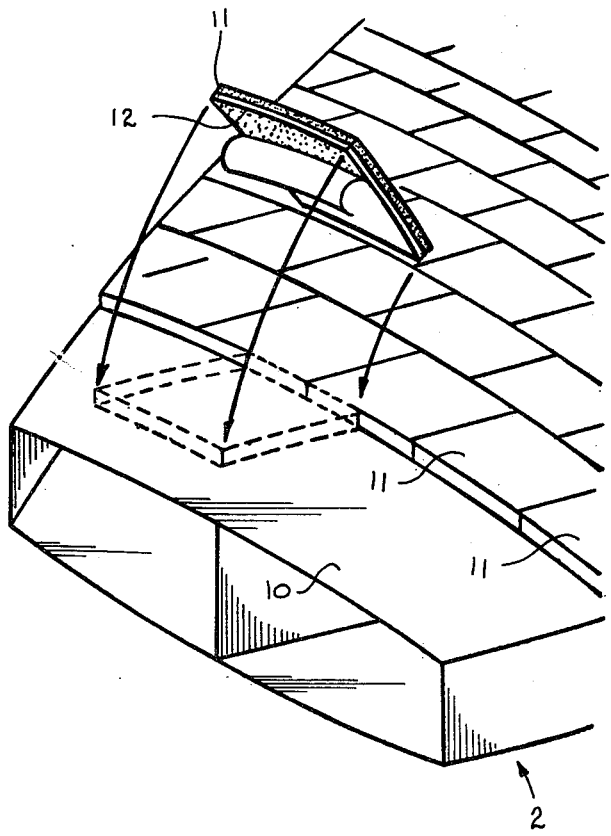
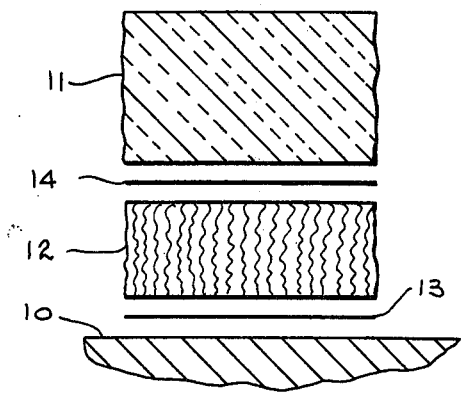

THERMAL INSULATION ATTACHING MEANS

ORIGIN OF THE INVENTION

The invention described herein was made by an employee of the United States Government and may be manufactured and used by or for the Government of the United States of America for governmental purposes without the payment of any royalties thereon or therefor.

This is a continuation-in-part of Ser. No. 555,750, filed Mar. 5, 1975, now abandoned.

BACKGROND OF THE INVENTION

This invention relates to thermal insulation and, more particularly, to improved means for attaching insulating tiles having one coefficient of thermal expansion to a structure having a markedly different coefficient of thermal expansion.

Portions of the space shuttle orbiter which are subject to temperatures in the range of −250° F. to 2300° F., utilize tiles formed of substantially chemically pure silica fibers which are rigidized with a high purity silica binder. The tiles, known as L1-900, are manufactured by Lockheed Missiles & Space Co., Inc., have a density of 9 lbs/cu. ft., relatively low strength, extremely high temperature resistance, and extremely low coefficient of thermal expansion as compared to metals. Because of the relatively low strength, the tiles cannot be used for load-bearing and must be secured to the protected structure by an attachment system which will minimize transfer of strains from the metal structure to the tile.

Ordinarily this requirement of minimizing load (strain) transfer into a low strength insulator is met by the use of a bond having a strain isolation capability, i.e., a flexible bond. However, during operation in space, the space shuttle orbiter will be subject to −250° F., which is far below the glass transition temperature of known flexible bonds. At such temperature, the bonds lose their flexibility and behave as rigid connectors. As such, they permit enough strain to be passed through from the metal structure to the insulators so that the latter become mechanically loaded and as a result crack and spall. This result obtains whether the transferred strain is mechanical or thermal in nature, and whether it takes the form of a shock or is gradual in nature, as when the structure being protected contracts (or expands) as its temperature falls (or rises in the latter case).

To overcome some of these problems, an attachment technique has been proposed in a co-pending U.S. patent application Ser. No. 419,748 filed on Nov. 28, 1973, and entitled "Strain Arrestor Plate," (now U.S. Pat. No. 3,920,339) wherein a rigid strain arrestor plate and silicone foam pad is interposed between the insulating tiles and the surface of the structure to be protected. This attachment system isolates thermal and mechanical strains from the tile down to −100° F. at which point the material modulus significantly increases as glass transition temperature (−170° F.) is approached. Further, it is subject to certain disadvantages such as difficulty of assembly, additional weight, and expense.

It has also been proposed to employ only the silicone foam pads as an attachment system for the orbiter. This technique is also limited to usage at temperatures above −100° F. because of glass transition problems as previously discussed. Consequently, use of this foam pad technique would require that the space shuttle orbiter be thermally conditioned by maintaining it in a rotating attitude so that the temperature of the foam pad does not reach a temperature below approximately −100° F.

These disadvantages of the prior art are overcome with the present invention, and improved methods and apparatus are herewith provided for attaching rigid, fragile insulating tiles to a structure to be protected against the extreme low temperature (−250° F.) encountered by the space shuttle orbiter.

SUMMARY OF THE INVENTION

As hereinbefore explained, portions of the space shuttle orbiter are protected from extreme temperatures resulting from reentry into the atmosphere by ceramic tiles which are laid in a closely abutting manner on portions of the surface of the structure to provide a protective shield or shell thereabout. Although the temperatures on the external surface of these ceramic tiles may reach 2300° F. during reentry, the temperature of these tiles and associated attachment system will be as low as −250° F. during orbital operations. Since the metallic structure has a thermal expansion coefficient which is markedly different from that of the ceramic material, the tiles must be isolated by an intermediate layer of material which yields to or absorbs the stresses which arise from expansion or contraction of the metallic structure, and/or mechanical deflections which will otherwise fracture the tiles. In the preferred embodiment of the present invention, this intermediate layer is composed of a strain isolation pad formed of fibers of a suitable material which are closely arranged and randomly oriented to provide a felt-like configuration. The pad is attached to the tile and to the structure by thin layers of a flexible adhesive. These fibers may be composed of organic or inorganic based materials which are sufficiently stable in the temperature range of interest (−250° F. to 500° F.) and capable of being felted with suitable mechanical properties.

These and other features and advantages of the present invention will become apparent from the following detailed description, wherein reference is made to the figures in the accompanying drawings.

BRIEF DESCRIPTION OF THE DRAWINGS

FIG. 1 is a simplified pictorial representation of the space shuttle orbiter showing the various portions of the external surface to which insulating tiles of silica will be attached. The lower half of the FIG. illustrates the bottom side of the vehicle, and the upper half illustrates the top side of the vehicle.

FIG. 2 is a simplified pictorial representation of an exemplary portion of the vehicle external surface depicted in FIG. 1 and illustrating how the insulating tiles are attached to such portion.

FIG. 3 is an exploded representation of the attaching means depicted in FIG. 2.

DETAILED DESCRIPTION

Referring now to FIG. 1, there may be seen a simplified pictorial representation of a space vehicle 2 such as the space shuttle orbiter. The lower portion of the FIG. illustrates the bottom side of the vehicle, and the upper portion illustrates the top side of the vehicle. The vehicle is provided with wings 3 having leading edges 4 which are susceptible to extremely high temperatures upon reentry into the atmosphere of the earth and which are protected by a high density refractory material. The bottom side 5 of the vehicle (other than leading edges 4 of wings 3) and certain portions 6 of the top side of the vehicle upon reentry reach temperatures approaching 2300° F. These are as are protected by rigidized silica insulation. The remaining portions 7 of the top side of the vehicle, wings and fuselage, may reach temperatures approaching 1200° F. and are protected by other silica insulation and organic material with sufficient thermal stability.

Referring now to FIG. 2, there may be seen a pictorial representation of a portion of vehicle protected by high purity silica tiles and showing how the metallic outer surface 10 (aluminum alloy) of the vehicle may be covered with insulating tiles 11 laid thereon in a closely abutting manner. The tiles 11 are approximately 6 × 6 inches, with varying thickness depending upon specific vehicle locations and heat load. Accordingly, it will be apparent from FIG. 2 that the tiles 11 form a thermal shield over the surface 10. Furthermore, it will also be apparent from consideration of the structures depicted in FIG. 2 that tiles 11 will be subject to damaging structural stresses arising because of the difference in coefficient of thermal expansion between the metal of the vehicle 2 and the material from which the tiles 11 are fabricated, as well as deflections of the structure due to mechanical (both aerodynamic and internal pressure) loads unless such loads are isolated. Accordingly, in attaching each of the tiles 11 to the metallic surface 10, an intermediate layer of material, such as a felt pad 12, is interposed to act as a strain isolator. Although the temperature during reentry may be 2300° F., the effective temperature for the strain isolation pad will be 500° F. due to the insulating characteristics of the tiles.

Referring now to FIG. 3, there may be seen a simplified functional representation of the manner in which each tile 11 and pad 12 is affixed to the structure 10. More particularly, a thin layer (less than 10 mils) 14 of a suitable flexible adhesive such as a methylphenyl silicone (RTV 560 manufactured by the General Electric Company) attaches the insulating tile 11 to the strain isolation pad 12. A thin layer (less than 10 mils) 13 of the same adhesive attaches the isolation pad to the surface 10.

As more particularly shown in FIG. 3, the isolation pad 12 is preferably formed of fibers of a material having thermal vacuum stability and stability in air within the intermediate temperature range of −250° F. to 500° F. The fibers are closely arranged and randomly oriented whereby each filament fiber supports the tile 11 independently of the other fibers in the isolation pad 12. Although fibers of various organic and inorganic based materials may be utilized in forming felt pad 12, it has been determined that aramid fibers sold by DuPont under their trademark NOMEX are particularly well suited for the application as the strain isolation pad for the space shuttle orbiter. As reported in the January 1977 issue of Textile Research Journal, pp 62–66, NOMEX is poly (1,3-phenylene isophthalamide). Another fiber which may be used is novolocid, a highly cross-linked phenolic polymer, the constituents of which are carbon, hydrogen and oxygen and marketed by the Carborundum Corportion under its trademark KYNOL. Another material is a treated aramid marketed under the trademark DURETTE. For applications where the temperature and deflection requirements are less stringent other materials suitable for felting and having fibers capable of absorbing strain by bending may be utilized.

The preferred embodiment of the isolation pad 12 may be NOMEX formed into a felt approximately 160 mils thick. One such felt is made by Globe-Albany, Inc. and known as style number 2544 NRBZ. "NRBZ" stands for needled, calendered, heat set and waterproofed. Needled means that the fibers have been entangled during fabrication by a mechanical process. Calendered means that the material has passed between rollers heated to elevated temperatures under pressure. Heat set means that the material has been exposed to elevated temperatures in excess of 500° F., but less than 550° F., to achieve maximum fiber shrinkage prior to service use at that temperature. Waterproofed means an organic based coating has been added to the felt to provide water resistant characteristics. This material has been found to be especially suitable for space shuttle orbiter purposes.

Isolation pad 12, formed of such material, and approximately 160 mils thick is capable of deflecting approximately 30 mils under a tensile force of 5.3 psi, and has a tensile strength of substantially greater than or equal to 20 psi. Such material weighs 10±1 oz/sq. yd. and is not a weight penalty on a weight sensitive system, particularly since it is waterproofed and will not absorb moisture. For areas of the vehicle for which the structure is non-buckling, isolation pads of lesser thickness and lower deflection characteristics may be used. For example, some pads are as thin as 90 mils with deflection less than 5 mils at 5.3 psi tensile loading. In all cases, the isolation pads accommodate shear and tensile structural strains by translating these strains to bending strains in the individual fibers of the felt pad.

In constructing insulation for a structure such as the orbiter, strain isolation pads 12 are preferably first attached to silica insulating tiles 11 by a thin layer of adhesive 14 and then the combination is affixed to structure 10 by means of another thin layer of flexible adhesive 13. The adhesive bond line on both sides of the strain isolation pad is preferably held to a thickness of 7.5±2 mils, so that the adhesive will not penetrate deep enough into the isolation pad to recreate the problem of glass transition within the isolation pad. Although the layers of flexible adhesive bond will undergo glass transition in outer space (−170° F.) it has been determined that since the layers are very thin the transition will not be detrimental to the tile, whereas it was found that a thick layer undergoing glass transition would damage the tile.

Although the strain isolation pad 12 of the present invention is preferably formed of NOMEX, as hereinbefore described, other materials heretofore mentioned will also be suitable.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. In an insulating system for a space vehicle formed of a plurality of insulating tiles of substantially chemically pure rigidized silica tiles attached to a metal substrate of the space vehicle, the tiles having a coefficient of thermal expansion markedly lower than the coefficient of the metal substrate, the improvement comprising: a strain isolation pad between each tile and the metal substrate, said pad attached to each tile and the metal substrate by a separate, layer of flexible adhesive bond, having a thickness less than 10 mils, each pad being formed of a plurality of high temperature resistant, flexible, plastic fibers randomly oriented and closely arranged with respect to each other to form a needled felt configuration isolating said tile from thermal and mechanical stresses generated by deformation of said metal substrate of the space vehicle, said fibers being capable of absorbing within a temperature range of −250° F. to 500° F., said stresses by bending.

2. The insulating system described in claim 1, wherein said fibers in said strain isolation pad comprise aramid.

3. The insulating system of claim 2, wherein the strain isolation pad is approximately 160 mils thick and deflects approximately 30 mils under a tensile force of 5.3 psi with a tensile strength of substantially 20 psi.

4. The insulating system of claim 3 wherein the thin layers of flexible adhesive bond are each approximately 7.5 mils.

* * * * *